(12) United States Patent
Hsiao

(10) Patent No.: US 12,292,782 B2
(45) Date of Patent: May 6, 2025

(54) CONTROL SYSTEM USING DEVICE CONTROLLERS AND DEVICE ROOT TO MANAGE PROCESSING UNITS AND ASSOCIATED CONTROL METHOD

(71) Applicant: MEDIATEK INC., Hsin-Chu (TW)

(72) Inventor: Chih-Hsiang Hsiao, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 56 days.

(21) Appl. No.: 18/127,604

(22) Filed: Mar. 28, 2023

(65) Prior Publication Data

US 2024/0103600 A1 Mar. 28, 2024

Related U.S. Application Data

(60) Provisional application No. 63/410,612, filed on Sep. 27, 2022.

(51) Int. Cl.
*G06F 1/3293* (2019.01)
*G06F 1/10* (2006.01)
*G06F 1/324* (2019.01)
*G06F 1/3296* (2019.01)
*G06F 21/82* (2013.01)

(52) U.S. Cl.
CPC ............ *G06F 1/3293* (2013.01); *G06F 1/10* (2013.01); *G06F 1/324* (2013.01); *G06F 1/3296* (2013.01); *G06F 21/82* (2013.01)

(58) Field of Classification Search
CPC ........ G06F 1/3293; G06F 1/10; G06F 1/3296; G06F 1/324; G06F 21/82
See application file for complete search history.

(56) References Cited

U.S. PATENT DOCUMENTS

| 9,946,325 B2 * | 4/2018 | Leucht-Roth ......... G06F 1/3278 |
| 2012/0272088 A1 * | 10/2012 | Lee ...................... G06F 1/3253 713/501 |
| 2019/0274033 A1 | 9/2019 | Raleigh |

FOREIGN PATENT DOCUMENTS

| CN | 115079804 A | 9/2022 |
| TW | 202102996 A | 1/2021 |

* cited by examiner

*Primary Examiner* — Glenn A. Auve
(74) *Attorney, Agent, or Firm* — Winston Hsu

(57) ABSTRACT

A control system includes multiple device controllers and a device root. Each of the multiple device controllers corresponds to at least one processing unit, and is arranged to receive a hint from an application processor (AP), and generate a control signal for managing the at least one processing unit according to the hint. The device root is coupled to the multiple device controllers and includes a manager, wherein the manager is arranged to manage multiple processing units corresponding to the multiple device controllers according to multiple control signals corresponding to the multiple device controllers.

16 Claims, 5 Drawing Sheets

CONTROL SYSTEM USING DEVICE CONTROLLERS AND DEVICE ROOT TO MANAGE PROCESSING UNITS AND ASSOCIATED CONTROL METHOD

CROSS REFERENCE TO RELATED APPLICATIONS

This application claims the benefit of U.S. Provisional Application No. 63/410,612, filed on Sep. 27, 2022. The content of the application is incorporated herein by reference.

BACKGROUND

The present invention is related to control and setup for hardware pipe, and more particularly, to a control system that can connect hardware devices in the control system to each other and control powers, clocks, firewalls and/or privileges of the hardware devices.

Nowadays, artificial intelligence (AI) can help enhance image quality or video quality (e.g. AI can be used to perform super-resolution operations upon images or reduce noise in videos). For a traditional image processing system (which may include a camera, an image signal processor (ISP), an accelerated processing unit (APU), a memory that coupled between the ISP and the APU, and an application processor (AP)), the APU will be regarded as an AI accelerator to perform AI operations, and an operating system (OS) on the AP will process setup for hardware pipe (e.g. setup for connection between the camera, the ISP, the memory, and the APU). Some problems will occur, however. For example, different hardware devices may require different setup paths (i.e. different drivers may be required), which complicates the system, and the AP may require complex software stacks to process and build the hardware pipe, which may result in increased labor costs, reduced yields, and increased errors. In addition, since response speed of the AP is quite slow and the AP also needs to consume power, it may be inefficient to use the AP to control power for low power optimization. More importantly, using the AP to set up firewalls and privileges of the hardware devices for security may have lots of vulnerabilities and cause security issues. For some hardware devices with higher security requirements, additional security drivers may be required, which will increase additional costs. As a result, a novel system that can connect hardware devices in the system to each other and control powers, clocks, firewalls and/or privileges of the hardware devices, and an associated control method are urgently needed.

SUMMARY

It is therefore one of the objectives of the present invention to provide a control system that uses multiple device controllers (such as embedded hypervisors) and a device root (such as a root embedded hypervisor) to connect hardware devices in the system to each other and control powers, clocks, firewalls and/or privileges of the hardware devices, and an associated control method to address the above-mentioned issues.

According to an embodiment of the present invention, a control system is provided. The control system comprises multiple device controllers and a device root. Each of the multiple device controllers corresponds to at least one processing unit, and is arranged to receive a hint from an AP, and generate a control signal for managing the at least one processing unit according to the hint. The device root is coupled to the multiple device controllers, and comprises a manager, wherein the manager is arranged to manage multiple processing units corresponding to the multiple device controllers according to multiple control signals corresponding to the multiple device controllers.

According to an embodiment of the present invention, a control method is provided. The control method comprises: receiving a hint from an application processor (AP) by multiple device controllers, wherein each of the multiple device controllers corresponds to at least one processing unit, and is arranged to generate a control signal for managing the at least one processing unit according to the hint; and managing the multiple processing units by a device root according to multiple control signals generated by the multiple device controllers.

One of the benefits of the present invention is that in the control system of the present invention, the processing units can communicate to each other for setting up the hardware pipe through the device controllers, and use the same protocol of device controller for linking, which requires less software stacks at the AP. In addition, since response speed of the device controller is faster than that of the AP, the power and/or the clock of the corresponding processing unit can be controlled more instantly through a configuration between the device controllers and the device root. More importantly, since the firewalls and/or the privileges of the processing units are set up through the configuration between the device controllers and the device root without software at the AP involved, security issues caused by the AP can be solved. In addition, for some hardware devices with higher security requirements, the device root can directly access the HW RoT for the higher security requirements.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include"

and "comprise" are used in an open-ended fashion, and thus should be interpreted to mean "include, but not limited to . . . ".

Figure 1:
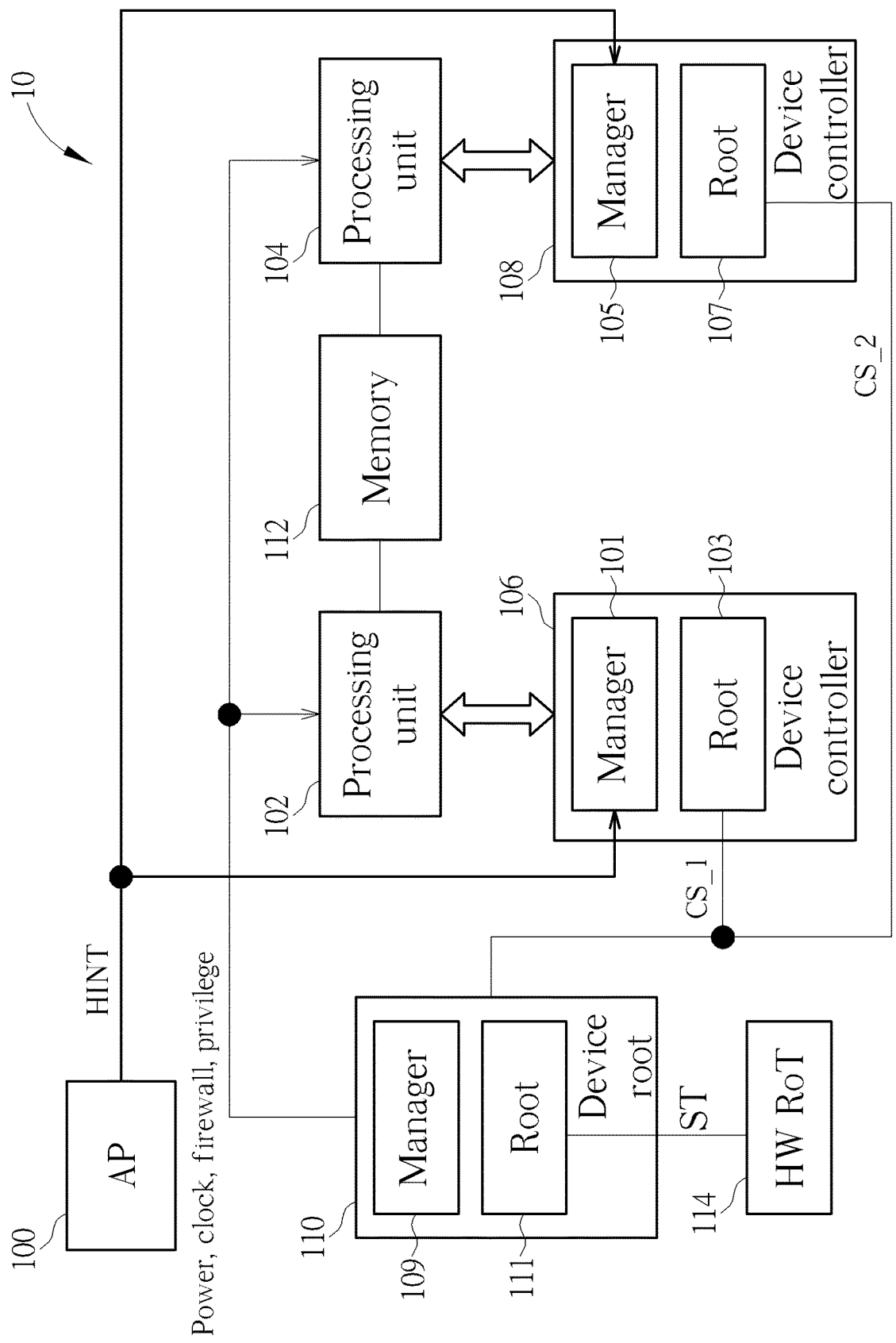
FIG. 1 is a diagram illustrating a control system according to an embodiment of the present invention.

FIG. 1 is a diagram illustrating a control system 10 according to an embodiment of the present invention. As shown in FIG. 1, the control system 10 may include an application processor (AP) 100, multiple processing units (e.g. two processing units 102 and 104), multiple device controllers (e.g. two device controllers 106 and 108), and a device root 110. In this embodiment, each of the multiple device controllers corresponds to only one processing unit (e.g. the device controller 106 corresponds to the processing unit 102, and the device controller 108 corresponds to the processing unit 104), but the present invention is not limited thereto. In some embodiments, any of the multiple device controllers may correspond to more than one processing units. The device controller 106 and 108, for example, can be embedded hypervisors, and the device root 110 can be a root embedded hypervisor. In addition, the control system 10 may further include a memory 112 that is coupled between the processing units 102 and 104, wherein the memory 112 may be arranged to share hardware pipe data between the processing units 102 and 104, and may be a dynamic random access memory (DRAM), but the present invention is not limited thereto. In some embodiments, for better performance and power optimization, the memory 112 may be a static random access memory (SRAM) or a line buffer.

Each of the multiple device controllers may include a manager and a root (e.g. the device controller 106 may include a manager 101 and a root 103, and the device controller 108 may include a manager 105 and a root 107), and the device root 110 may also include a manager 109 and a root 111, wherein the device controller 106 may be coupled to the device root 110 through the root 103, and the device controller 108 may be coupled to the device root 110 through the root 107. The manager in each of the multiple device controllers may receive a hint (labeled as "HINT" in FIG. 1) from the AP 100, and generate a control signal for managing the corresponding processing unit according to the hint. The root in each of the multiple device controllers may be arranged to connect to the device root 110, and transmit the control signal to the device root 110.

For example, the manager 101 in the device controller 106 may receive the hint from the AP 100, and generate a control signal CS_1 for managing the processing unit 102 according to the hint. The root 103 in the device controller 106 may be arranged to connect to the device root 110, and transmit the control signal CS_1 to the device root 110. For another example, the manager 105 in the device controller 108 may receive the hint from the AP 100, and generate a control signal CS_2 for managing the processing unit 104 according to the hint. The root 107 in the device controller 108 may be arranged to connect to the device root 110, and transmit the control signal CS_2 to the device root 110. It should be noted that, the device controllers 106 and 108 may be connected to each other through the roots 103 and 107. As a result, the processing units 102 and 104 can communicate to each other for setting up the hardware pipe through the device controllers 106 and 108, and use the same protocol of device controller for linking, which requires less software stacks at the AP 100.

The manager 109 of the device root 110 may be arranged to manage the processing units 102 and 104 according to the control signals CS_1 and CS_2, respectively. For example, the control signal (e.g. the control signal CS_1 or the control signal CS_2) may be arranged to instruct the manager 109 of the device root 110 to control a power and/or a clock of the corresponding processing unit (e.g. the processing unit 102 or the processing unit 104). Since response speed of the device controllers 102 and 104 is faster than that of the AP 100, the power and/or the clock of the corresponding processing unit can be controlled more instantly. For another example, the control signal (e.g. the control signal CS_1 or the control signal CS_2) may be arranged to instruct the manager 109 of the device root 110 to set up a firewall and/or a privilege of the corresponding processing unit (e.g. the processing unit 102 or the processing unit 104). The control system 10 may further include a hardware root of trust (HW RoT) 114, and the root 111 of the device root 110 may receive a safety setting ST from the HW RoT 114, wherein for the device controllers 106 and 108, the manager 109 of the device root 110 may be further arranged to set up firewalls or privileges of the processing units 102 and 104 according to the safety setting ST (e.g. the privileges of the processing units 102 and 104 can be provided by the HW RoT 114).

Under a condition that the control system 10 is modified to directly set up the firewalls and/or the privileges of the processing units 102 and 104 by the AP 100 (i.e. the control system 10 is modified to not include the device controllers 106 and 108 and the device root 110), the process of setup for the firewalls and the privileges of the processing units 102 and 104 may suffer from security issues due to vulnerabilities caused by the AP 100. For some hardware devices with higher security requirements, additional security drivers may be required, which will increase additional costs. In this embodiment, the firewalls and/or the privileges of the processing units 102 and 104 are set up through a configuration between the device controllers 106 and 108 and the device root 110 without software at the AP 100 involved, which can address the above-mentioned security issues. In addition, for some hardware devices with higher security requirements, the device root 110 can directly access the HW RoT 114 for the higher security requirements.

One device controller may correspond to (or manage) only one processing unit or multiple processing units. The multiple device controllers in a control system may include a first device controller that corresponds to (or manage) only one processing unit and a second device controller that corresponds to (or manage) multiple processing units. Or, each of the multiple device controllers in a control system may correspond to (or manage) only one processing unit. Yet in another embodiment, each of the multiple device controllers in a control system may correspond to (or manage) multiple processing units.

Figure 2:
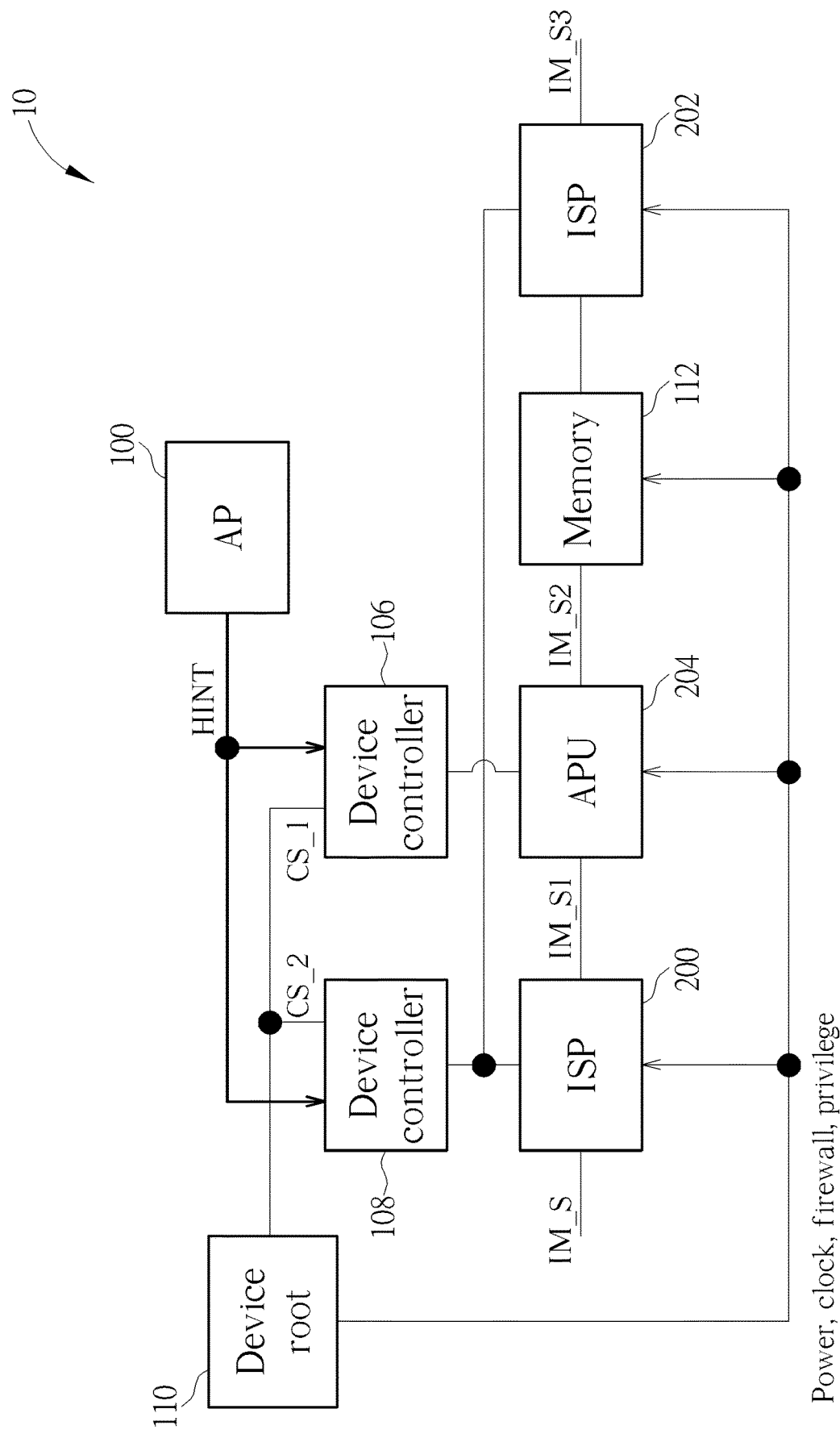
FIG. 2 is a diagram illustrating an application of the control system shown in FIG. 1 according to a first embodiment of the present invention.

FIG. 2 is a diagram illustrating an application of the control system 10 shown in FIG. 1 according to a first embodiment of the present invention. In this embodiment, the device controller 106 corresponds to an accelerated processing unit (APU) 204 (i.e. the device controller 106 corresponds to only one processing unit), and the device controller 108 corresponds to two image signal processors (ISPs) 200 and 202 (i.e. the device controller 108 corresponds to two processing units). The ISP 200 may be arranged to receive an image signal IM S from a camera (not shown), and process the image signal IM S to generate a first processed image signal IM_S1. The APU 204 may be regarded as an AI accelerator, and may perform AI processing upon the first processed image signal IM_S1 to generate a second processed image signal IM_S2. The ISP 202 may be arranged to process the second processed image signal IM_S2 to generate a third processed image signal IM_S3.

The APU 204 and the ISPs 200 and 202 can communicate to each other for setting up the hardware pipe through the device controllers 106 and 108, and use the same protocol of device controller for linking. Through a configuration between the device controller 106 and the device root 110, the clock and/or the power of the APU 204 can be controlled, and the firewall and/or the privilege of the APU 204 can be set up. Similarly, through a configuration between the device controller 108 and the device root 110, the clock and/or the power of the ISPs 200 and 202 can be controlled, and the firewall and/or the privilege of the ISPs 200 and 202 can be set up. For brevity, similar descriptions for this embodiment are not repeated in detail here.

Figure 3:
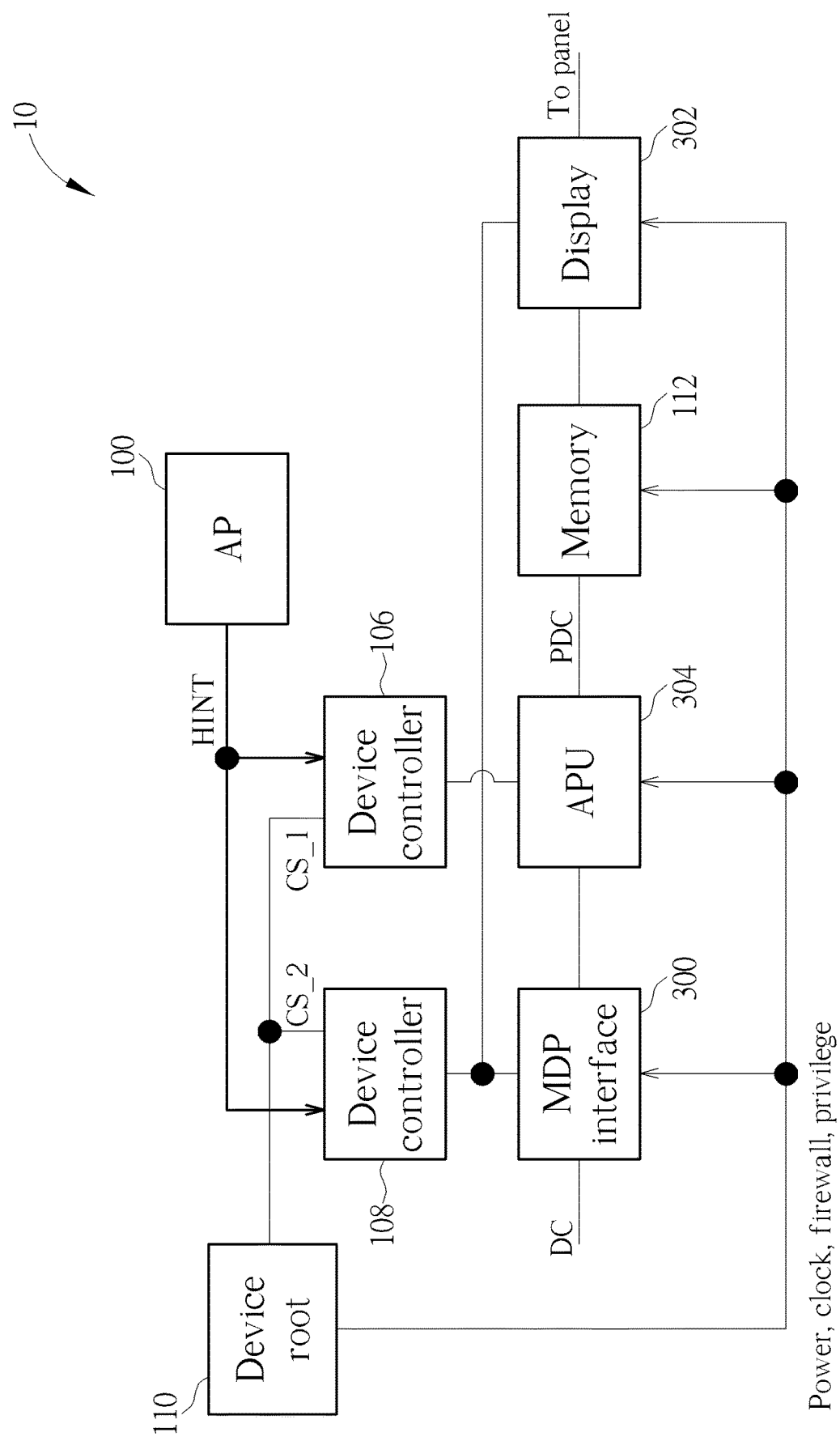
FIG. 3 is a diagram illustrating an application of the control system shown in FIG. 1 according to a second embodiment of the present invention.

FIG. 3 is a diagram illustrating an application of the control system 10 shown in FIG. 1 according to a second embodiment of the present invention. In this embodiment, the device controller 106 corresponds to an APU 304 (i.e. the device controller 106 corresponds to only one processing unit), and the device controller 108 corresponds to a Mini DisplayPort (MDP) interface 300 and a display 302 (i.e. the device controller 108 corresponds to two processing units). The MDP interface 300 may be arranged to receive a display content DC and transmit the display content DC to the APU 304. The APU 304 may be regarded as an AI accelerator, and may perform AI processing upon the display content DC to generate a processed display content PDC. The display 302 may be arranged to display the processed display content PDC on a panel (not shown).

The MDP interface 300, display 302, and APU 304 can communicate to each other for setting up the hardware pipe through the device controllers 106 and 108, and use the same protocol of device controller for linking. Through a configuration between the device controller 106 and the device root 110, the clock and/or the power of the APU 304 can be controlled, and the firewall and/or the privilege of the APU 304 can be set up. Similarly, through a configuration between the device controller 108 and the device root 110, the clock and/or the power of the MDP interface 300 and the display 302 can be controlled, and the firewall and/or the privilege of the MDP interface 300 and the display 302 can be set up. For brevity, similar descriptions for this embodiment are not repeated in detail here.

Figure 4:
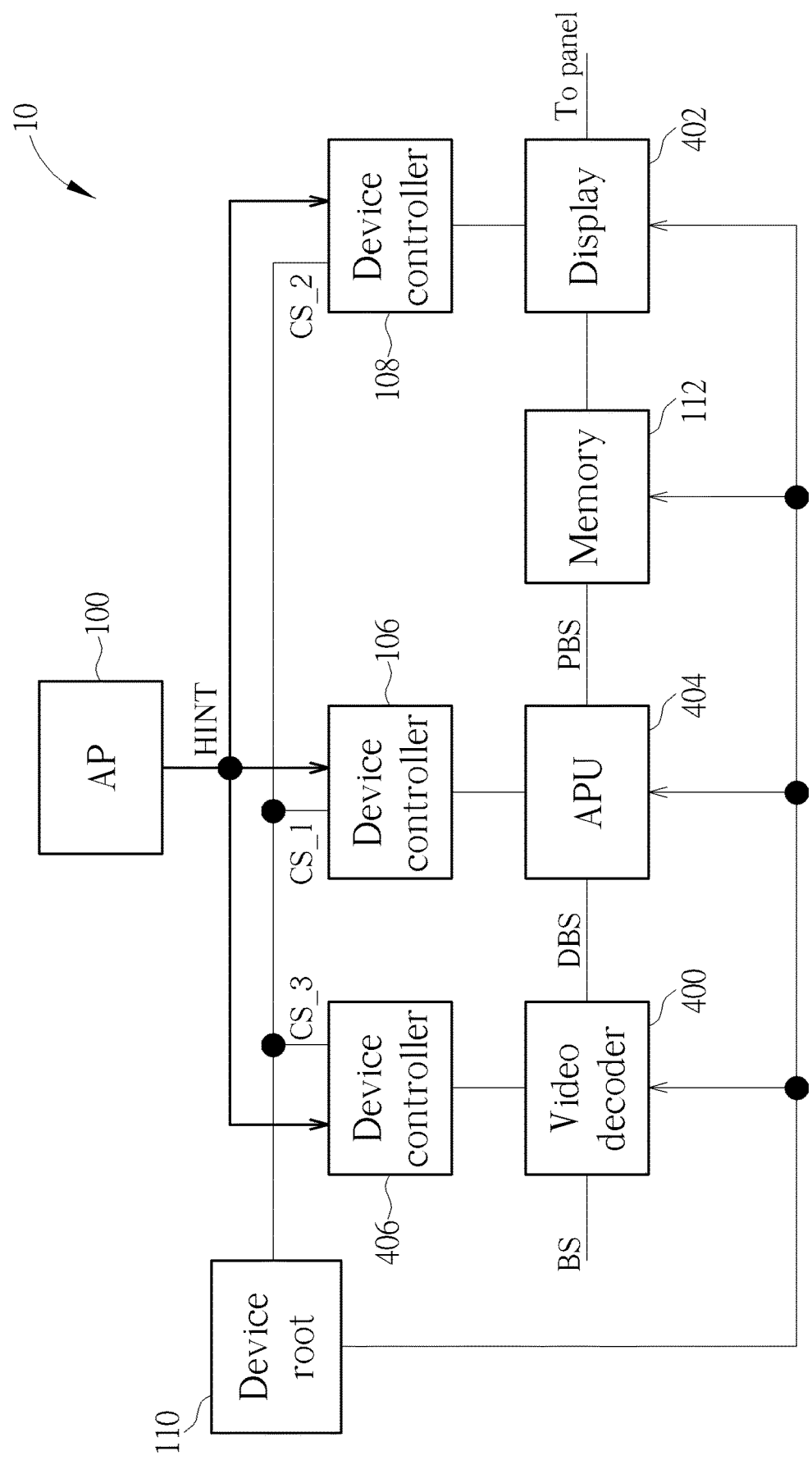
FIG. 4 is a diagram illustrating an application of the control system shown in FIG. 1 according to a third embodiment of the present invention.

FIG. 4 is a diagram illustrating an application of the control system 10 shown in FIG. 1 according to a third embodiment of the present invention. In this embodiment, the device controller 106 corresponds to an APU 404 (i.e. the device controller 106 corresponds to only one processing unit), and the device controller 108 corresponds to a display 402 (i.e. the device controller 108 corresponds to only one processing unit). In addition, the control system 10 may further include an device controller 406 (which for example can be an embedded hypervisor), wherein the device controller 406 corresponds to a video decoder 400, and may receive the hint from the AP 100 and generate a control signal CS_3 for managing the video decoder 400 according to the hint. The video decoder 400 may be arranged to receive a bitstream BS and decode the bitstream BS to generate a decoded bitstream DBS. The APU 404 may be regarded as an AI accelerator, and may perform AI processing upon the decoded bitstream DBS to generate a processed bitstream PBS. The display 402 may be arranged to display the processed bitstream PBS on a panel (not shown).

The video decoder 400, the display 402, and APU 404 can communicate to each other for setting up the hardware pipe through the device controllers 106, 108, and 406, and use the same protocol of device controller for linking. Through a configuration between the device controller 106 and the device root 110, the clock and/or the power of the APU 404 can be controlled, and the firewall and/or the privilege of the APU 404 can be set up. Similarly, through a configuration between the device controller 108 and the device root 110, the clock and/or the power of the display 402 can be controlled, and the firewall and/or the privilege of the display 402 can be set up. Similarly, through a configuration between the device controller 406 and the device root 110, the clock and/or the power of the video decoder 400 can be controlled, and the firewall and/or the privilege of the video decoder 400 can be set up. For brevity, similar descriptions for this embodiment are not repeated in detail here.

Figure 5:
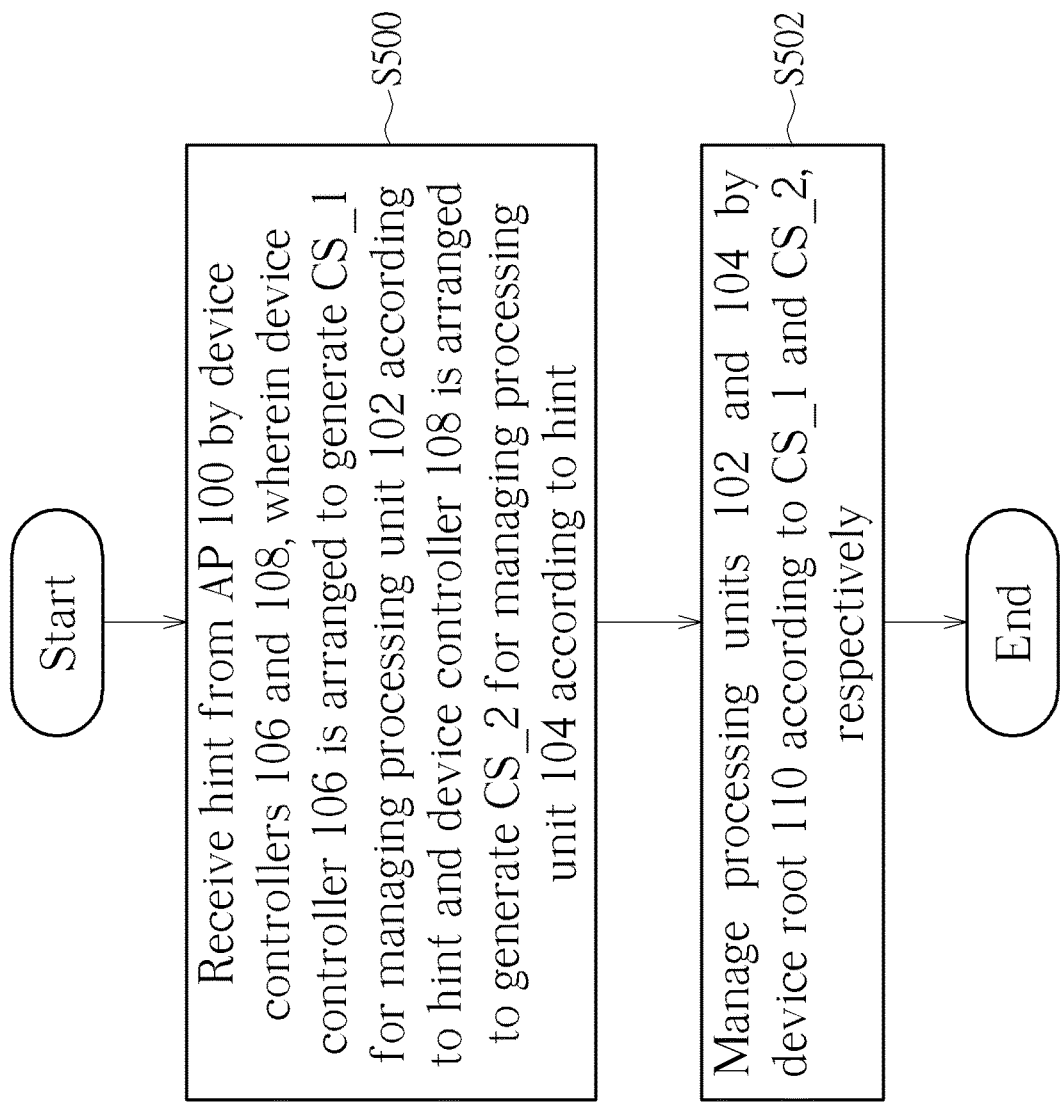
FIG. 5 is a flow chart of a control method using multiple device controllers and a device root to manage at least one processing unit according to an embodiment of the present invention.

FIG. 5 is a flow chart of a control method using multiple device controllers and a device root to manage at least one processing unit according to an embodiment of the present invention. Provided that the result is substantially the same, the steps are not required to be executed in the exact order shown in FIG. 5. For example, the control method shown in FIG. 5 can be employed by the control system 10 shown in FIG. 1.

In Step S500, a hint is received from the AP 100 by the device controllers 106 and 108, wherein the device controller 106 corresponds to the processing unit 102, and is arranged to generate the control signal CS_1 for managing the processing unit 102 according to the hint; and the device controller 108 corresponds to the processing unit 104, and is arranged to generate the control signal CS_2 for managing the processing unit 104 according to the hint.

In Step S502, the processing units 102 and 104 are managed by the device root 110 according to the control signals CS_1 and CS_2, respectively.

Since a person skilled in the pertinent art can readily understand details of the steps shown in FIG. 5 after reading the above paragraphs, further description is omitted here for brevity.

In summary, in the control system of the present invention, the processing units can communicate to each other for setting up the hardware pipe through the device controllers, and use the same protocol of device controller for linking, which requires less software stacks at the AP. In addition, since response speed of the device controller is faster than that of the AP, the power and/or the clock of the corresponding processing unit can be controlled more instantly through a configuration between the device controllers and the device root. More importantly, since the firewalls and/or the privileges of the processing units are set up through the configuration between the device controllers and the device root without software at the AP involved, security issues caused by the AP can be solved. In addition, for some hardware devices with higher security requirements, the device root can directly access the HW RoT for the higher security requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control system, comprising:
multiple device controllers, wherein each of the multiple device controllers corresponds to at least one processing unit, a hint from an application processor (AP) indicates each of the multiple device controllers to manage the at least one processing unit; and said each of the multiple device controllers is arranged to receive the hint from the AP, and generate and transmit a control signal to a device root according to the hint, for managing the at least one processing unit via the device root; and the device root, coupled to the multiple device controllers, and comprising:

a manager, arranged to manage multiple processing units corresponding to the multiple device controllers according to multiple control signals corresponding to the multiple device controllers.

2. The control system of claim 1, wherein for said each of the multiple device controllers, the control signal is arranged to instruct the manager of the device root to control a power of the at least one processing unit.

3. The control system of claim 1, wherein for said each of the multiple device controllers, the control signal is arranged to instruct the manager of the device root to control a clock of the at least one processing unit.

4. The control system of claim 1, wherein for said each of the multiple device controllers, the control signal is arranged to instruct the manager of the device root to set up a firewall of the at least one processing unit.

5. The control system of claim 1, wherein for said each of the multiple device controllers, the control signal is arranged to instruct the manager of the device root to set up a privilege of the at least one processing unit.

6. The control system of claim 1, wherein said each of the multiple device controllers comprises:

a manager, arranged to generate the control signal for managing the at least one processing unit according to the hint; and a root, arranged to connect to the device root, and transmit the control signal to the device root.

7. The control system of claim 1, wherein the device root further comprises:

a root, arranged to receive a safety setting from a hardware root of trust (ROT);

wherein the manager of the device root is further arranged to set up a firewall or a privilege of the at least one processing unit according to the safety setting.

8. The control system of claim 1, wherein the multiple device controllers comprise a first device controller and a second device controller, at least one processing unit corresponding to the first device controller comprises a first image signal processor (ISP) and a second ISP, and at least one processing unit corresponding to the second device controller comprises an accelerated processing unit (APU).

9. The control system of claim 1, wherein the multiple device controllers comprise a first device controller and a second device controller, at least one processing unit corresponding to the first device controller comprises a Mini DisplayPort (MDP) interface and a display, and at least one processing unit corresponding to the second device controller comprises an accelerated processing unit (APU).

10. The control system of claim 1, wherein the multiple device controllers comprise a first device controller, a second device controller, and a third device controller, at least one processing unit corresponding to the first device controller comprises a video decoder, at least one processing unit corresponding to the second device controller comprises an accelerated processing unit (APU), and at least one processing unit corresponding to the third device controller comprises a display.

11. A control method, comprising:

receiving a hint from an application processor (AP) by multiple device controllers, wherein each of the multiple device controllers corresponds to at least one processing unit, the hint indicates said each of the multiple device controllers to manage the at least one processing unit, and said each of the multiple device controllers is arranged to generate and transmit a control signal to a device root according to the hint, for managing the at least one processing unit via the device root; and managing, by the device root, multiple processing units corresponding to the multiple device controllers according to multiple control signals corresponding to the multiple device controllers.

12. The control method of claim 11, wherein the control signal is arranged to instruct the device root to control a power of the at least one processing unit.

13. The control method of claim 11, wherein the control signal is arranged to instruct the device root to control a clock of the at least one processing unit.

14. The control method of claim 11, wherein the control signal is arranged to instruct the device root to set up a firewall of the at least one processing unit.

15. The control method of claim 11, wherein the control signal is arranged to instruct the device root to set up a privilege of the at least one processing unit.

16. The control method of claim 11, further comprising:

receiving a safety setting from a hardware root of trust (ROT) by the device root; and setting up a firewall or a privilege of the at least one processing unit by the device root according to the safety setting.

* * * * *